June 23, 1936.    J. J. KUNDIG    2,045,274
AUTOMATIC LIGHT CONTROL
Filed July 2, 1934    3 Sheets-Sheet 1
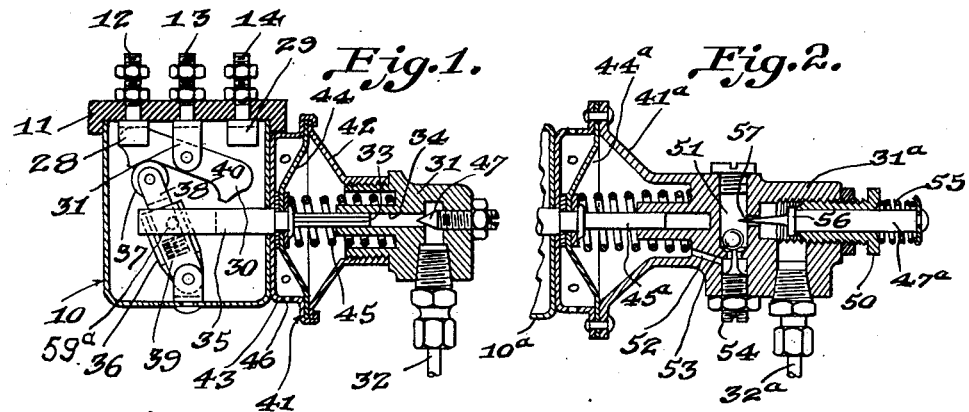
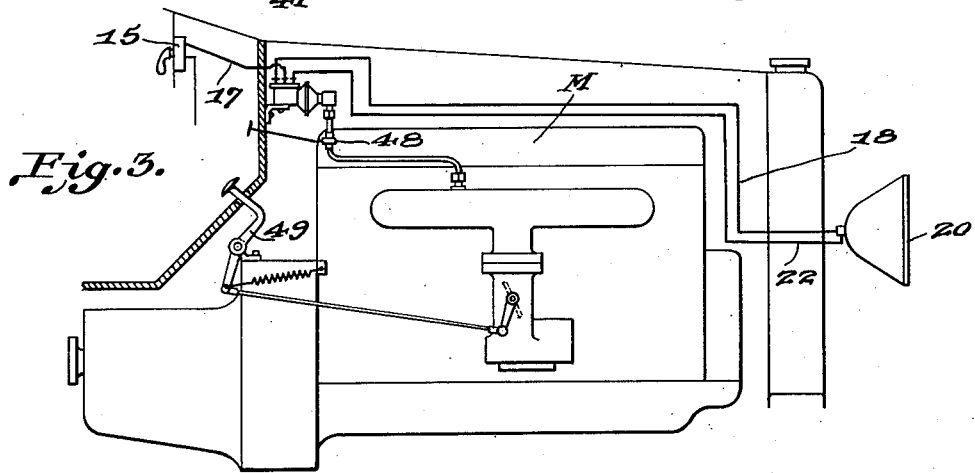
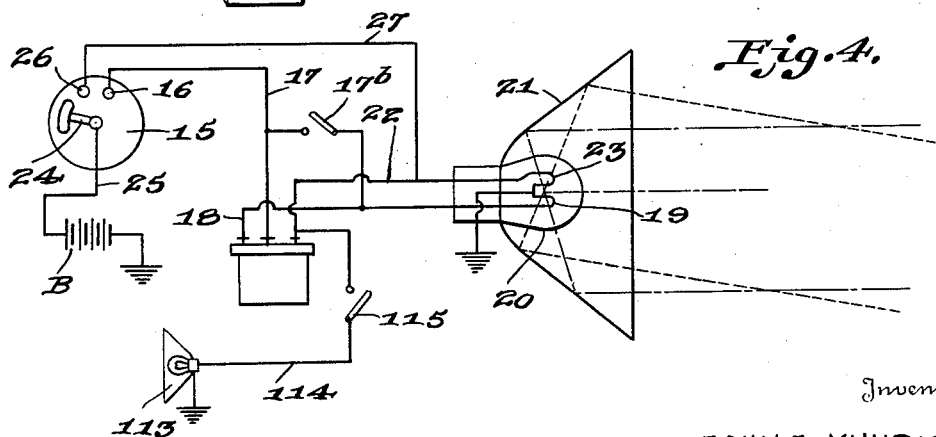
Inventor
JOHN J. KUNDIG
By C. P. Goepel
Attorney

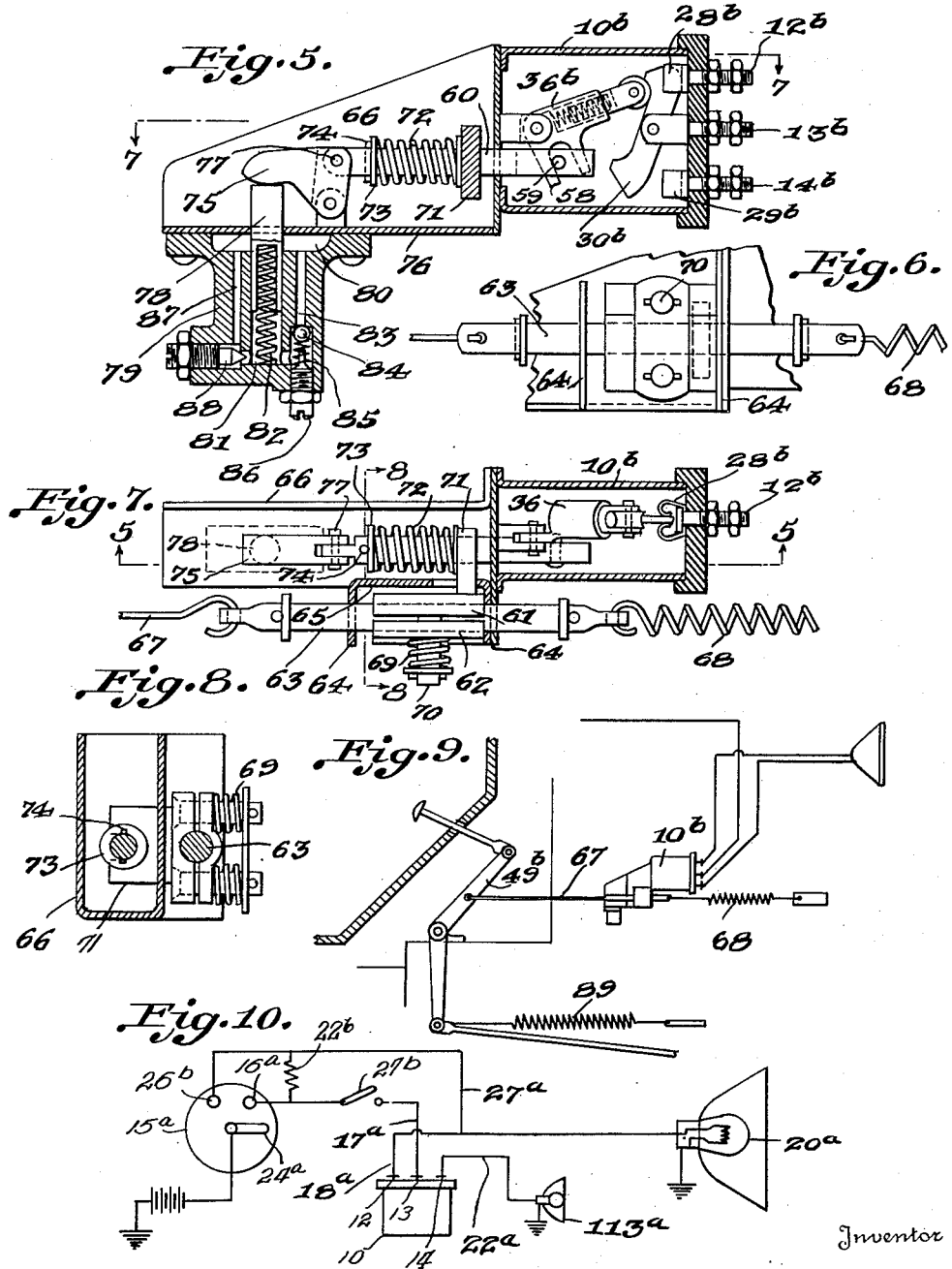

June 23, 1936.  J. J. KUNDIG  2,045,274
AUTOMATIC LIGHT CONTROL
Filed July 2, 1934   3 Sheets-Sheet 3
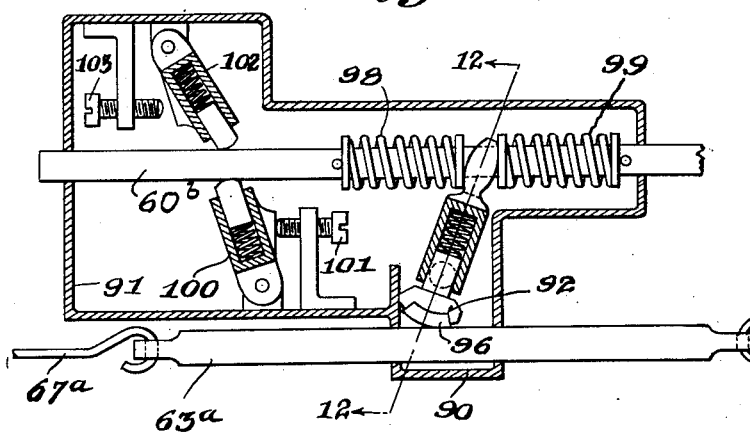
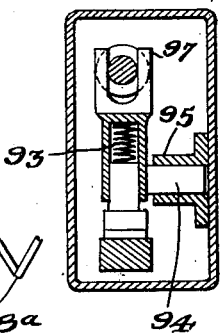
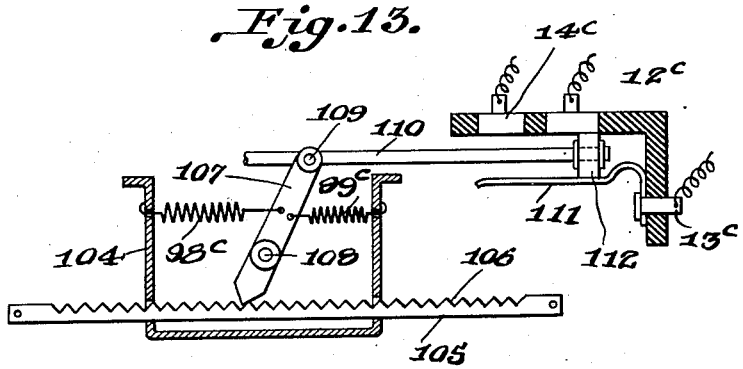
Inventor
JOHN J. KUNDIG
C. P. Goepel
By
Attorney Patented June 23, 1936

2,045,274

UNITED STATES PATENT OFFICE 2,045,274

AUTOMATIC LIGHT CONTROL

John J. Kundig, New York, N. Y.

Application July 2, 1934, Serial No. 733,533

16 Claims. (Cl. 171—97)

This invention consists of apparatus for automatically or semi-automatically operating an electric circuit switch into open or closed position, and particularly for automatically operating a switch for controlling the lights of an automotive vehicle.

One improvement consists of control means, whereby such a switch is automatically actuated in synchronism with the manual operation of the accelerator or throttle of the driving engine in such a manner that the automatic control means act in one direction upon a predetermined minimum operation of the throttle from any position in its course of travel towards its closed position, and in an opposite direction upon a predetermined minimum operation of the throttle from any position of its course of travel towards its open position.

Another improvement consists of adjusting means whereby the actions or movements of the automatic control means may be retarded relatively to the movements of the throttle to thereby dampen the sensitiveness of the mechanism which otherwise would cause frequent and undesirable flickering of the thereby controlled lights, such as during the relatively short time periods of changing the speed in the transmission, which necessitates a momentary closing of the throttle. Short periodical reversed movements of the throttle, such as caused by unsteadiness of the driver's foot on the accelerator pedal will, therefore, fail to cause actuation of the switch.

Another improvement consists of arrangements of the adjusting means to regulate the retarding effect of the switch control means differently in the two directions of actuation, whereby, for example, I may effect a retarded actuation upon a movement of the throttle towards its closed position and a concurrent reversed actuation upon an opening operation of the throttle or vice versa.

The main object of the invention is to automatically control the light beam projected from the headlight or lights of an automobile to thereby remove the glare of the light beam from the field of view of an oncoming driver at the proper time.

Another object of this invention consists of the automatic lighting of a signal light at the rear of the car upon a predetermined minimum operation of the throttle from any position in its course of travel towards its closed position to thereby signal to the following car the driver's intention of slowing down the speed of the car.

It is a well known fact that the blinding glare of head lights from and upon oppositely driving cars presents one of the biggest hazards in night driving. To partially remedy this, numerous devices have been introduced, such as manually operable switches for shutting off or deflecting the glaring light beam, or to diminish the intensity thereof at the appearance of an oncoming car. However, such devices often fail in their effectiveness, as the majority of drivers neglect their operation at the proper time, due mainly to the inconvenience of fumbling for the switch with a hand or foot, while intensive attention must be given to the operation of the car on the road.

The invention as herein disclosed performs the operation of controlling the light beam without any attention of the driver, due to the fact that practically every driver, upon entering the blinding glare zone of an oncoming car instinctively tends to diminish the speed of the car, at least to a certain extent by partly relieving the pressure upon the accelerator pedal to thereby actuate the throttle towards its closed position.

Other objects and advantages will be apparent from the following detailed description, and from the drawings, wherein:

Figure 1 is a longitudinal section, partly in detail, of one form of head light control means constructed according to an embodiment of this invention.

Figure 2 is a longitudinal section, partly broken away, of a modified form of the control means shown in Fig. 1.

Figure 3 is a detail side elevation of the device mounted on a vehicle which is shown diagrammatically and in fragmentary form.

Figure 4 is a diagrammatic view of the electric circuit in which the device is interposed.

Figure 5 is a longitudinal section of another form of this device, taken on the line 5—5 of Fig. 7.

Figure 6 is a fragmentary side elevation of the device shown in Figure 5 showing the frictional clutch for operation of the device.

Figure 7 is a sectional view taken on the line 7—7 of Fig. 5.

Figure 8 is a sectional view taken on the line 8—8 of Fig. 7.

Figure 9 is a diagrammatic view of the device shown in Figs. 5, 6, 7, and 8 interposed in a vehicle lighting circuit and connected to the throttle control for the engine.

Figure 10 is a modified form of circuit diagram in which this device is interposed.

Figure 11 is a longitudinal section, partly in detail of a further form of this invention.

Figure 12 is a sectional view taken on the line 12—12 of Fig. 11.

Figure 13 is a fragmentary longitudinal section of a still further form of this invention.

Referring now to the drawings, and first to Fig. 1, the numeral 10 designates generally a housing or casing provided with an insulated top or closure 11, having terminals 12, 13, and 14 mounted therein. The terminal 13 is a central terminal and is adapted to be connected to a source of current supply, and may be connected to a lighting switch 15, shown in Fig. 3.

The terminal 13 is connected to a contact 16 on the switch 15 as by a conductor 17, and a conductor 18 connects the terminal 12 to the lower filament 19 of a light bulb 20 mounted in a headlight 21. The terminal 14 is connected as by a conductor 22 to the upper or dim side of the light bulb, being connected to the upper filament 23.

For the purpose of exemplification, I have shown the commonly used double beam headlight bulb as a light source, wherein the lower filament 19, being located below the focus center of a parabolic reflector of the headlight 21, projects a light beam in a general horizontal direction ahead of the vehicle and which is generally called the bright light, while the upper filament 23, located above said focus center, projects its light beam in a downwardly deflected direction to illuminate only a limited portion of the road ahead of the vehicle and out of the field of view of an oncoming driver. This latter beam is generally called the dim light.

The switch 15 is of conventional construction, and in this instance comprises a switch arm 24 connected as by a conductor 25 to a battery B or other source of current supply. A contact 26 is connected to the dim filament 23 as by a conductor 27. One side of the battery B is connected to the ground, and in this instance the frame of the vehicle, and in like manner one side of the filament is also connected to the ground.

The terminal 12 has within the housing 10 a spring contact 28, and the terminal 14 also has a spring contact 29 which is similar to the contact 28. A switch arm or blade 30 is rockably mounted on the forked inner end 31 of the terminal and is adapted, upon rocking thereof, to connect either of the terminals 12 or 14 with the central terminal 13.

In order to effect operation of the switch blade 30, I have herein disclosed two distinctly different types of automatically acting control means responding to the same basic impulses, namely, to relatively small movements of the engine throttle in either direction and from any and all positions of the latter's course of travel. The devices shown in Figs. 1, 2, and 3, consist of the previously described switch directly operated by a fluid pressure, respectively vacuum actuator which is operable in conjunction with a conventional internal combustion engine. As I may use any suitable type of actuator, such as a cylinder and piston, I have illustrated a diaphragm chamber type including a casing 31 which is adapted to be connected as by a connector 32 to the intake or suction line of the motor M at any convenient place thereof between the carburetor throttle and the intake valves of the motor. An operating rod 33 provided with longitudinal grooves for the passage of vacuum, is slidably mounted in a guide 34 provided in the casing 31, and the opposite end of this rod 33 carries a pin 59a engaging with lost motion in a channel formed on one side of a barrel 36 mounted for rocking movement in the housing 10. An insulating roller 37 mounted on a plunger 38 is constantly urged in the direction of the switch arm 30 by a spring 39 mounted in the barrel 36. One side of the switch arm 30 has a guide track 40 terminating at each end in stops so as to prevent the roller from riding off the track 40.

A diaphragm housing 41 is interposed between the casing 31 and the housing 10. The diaphragm housing 41 comprises a housing section 42 threaded onto the inner end of the casing 31, and a housing section 43 connected to the housing 10. A diaphragm 44 is disposed between the sections 42 and 43 and is secured to the inner end of the operating rod 35. A spring 45 carried by the casing 31 engages against the diaphragm and constantly urges the diaphragm 44 and the rod 35 in a direction to rock the switch arm 30 to connect the terminal 13 with the terminal 12. The tension of the spring 45 is of such proportion to the vacuum-exposed surface area of the diaphragm as to maintain balance to a predetermined amount of suction power. The housing section 43 is provided with a plurality of vents 46 so that the atmospheric pressure may act on one side of the diaphragm 44 against the lower pressure on the other side thereof to effect movement of the diaphragm against the tension of the spring 45.

Since the magnitude of absolute pressure, respectively vacuum, in the intake line of the engine is directly proportional to the speed of the engine revolutions and indirectly to the extent of the throttle opening, it will be understood that the density of the vacuum in the intake line will be of nearly equivalent magnitude for a given load resistance of the engine at any throttle position during the periods when the engine has reached the speed relating to the particular extent of the throttle opening.

Since the tension of the spring 45 is regulated to counterbalance the effect of said equivalent density of vacuum upon the diaphragm 44, the switch blade 30 will remain in its position, as shown in Fig. 1. If, however, the throttle valve is suddenly being operated towards its closed position, even to a relatively small extent in order to reduce the speed, the vacuum or suction will instantly increase as the engine speed will reduce much slower due to the inherent inertia of the vehicle. Such increased suction will automatically actuate the diaphragm 44 and rock the switch blade 30 in the opposite position, which results in the desired deflection or dimming of the head light. Obviously, upon a subsequent operation of the throttle valve towards a greater opening, the suction power will instantly decrease with the result that the spring 45 will act to return the switch blade to its original position.

In order to regulate the operation speed and sensitiveness of the diaphragm responding to the pressure variation in the line 32, I may provide a threaded needle valve 47 to regulate the passage to the bore 34. A cut-off valve 48 may be mounted in the suction line 32 so that if desired the operation of the device may be cut off.

When the conventional foot pedal 49 is rocked in a manner to open the carburator and speed up the engine or motor M, the spring 45 is of sufficient strength to overcome the reduced vacuum in the vacuum chamber of the housing 41, and therefore will be able to hold the switch arm 30 to close the circuit to the lower filament 19 through the terminal 12. In the event, however, the pedal 49 is retarded the higher suction or vacuum created by the obstruction of the carburator of motor M will overcome the tension of the spring 45, and this will cause flexing of the diaphragm 44 to rock the blade operating member including the barrel 36 and roller 37 so that the blade 30 will engage the contact 29 and be disengaged from the contact 28. The dim filament 23 of the bulb 20 will then be lighted and will remain lighted until the carburator throttle of the motor M is again further opened by depressing the pedal 49, thereby diminishing the suction power acting upon the diaphragm 44.

As a sudden partial closure of the throttle at high engine speed will obviously cause a bigger increase of the vacuum than a similar operation of the throttle at a lower engine speed, the switch would be actuated by the diaphragm either too rapidly or too slowly. In order to automatically regulate the vacuum effect upon the diaphragm, I have incorporated a further improvement as shown in Fig. 2, wherein the casing 31a is integral with the diaphragm housing 41a. In this form I provide a needle valve 47a having a cylindrical portion which forms a plunger and fits slidably into an externally threaded bushing 50. The needle valve 47a will be pulled towards the left against the pressure of the spring 55 to automatically control the area of the suction portion 57 and thereby regulate the absolute fluid pressure differential between the line 32a, and the diaphragm chamber. In other words, the maximum suction power acting upon the diaphragm 41a will be regulated in proportion to the deflection of the spring 55, thereby effecting actuation of the switch blade 30 at a uniform speed upon variations of the throttle position at any speed range of the engine. The effective area of said suction port 57 may be further regulated by the adjustable bushing 50 which carries said needle valve 47a to thereby regulate the speed of the actuation in one direction. An intermediate chamber 51 is provided in the casing 31a and communicates with the vacuum chamber on the inner side of the diaphragm 44a by a passage 52. A check valve 53 is mounted in the chamber 51 and is partially unseated by means of a threaded member 54, whereby the passage of the fluid may be regulated to control the speed of actuation in the opposite direction.

The time period of a complete cycle of switch operation by the vacuum actuator may, therefore, be regulated to be equal to the average time period required for passing an oppositely driving vehicle to thereby eliminate the glare thereupon.

Where the engine or motor of the vehicle does not have a suitable suction line to which the light controlling means hereinbefore described may be attached, I have provided another form of switch operating means as disclosed in Figs. 5, 6, 7, 8, and 9. In this form the housing 10b has the usual terminals 12b, 13b, and 14b and the blade 30b. The barrel 36b has a forked member 58 engaged by a pin 59 carried by the slidable member 60.

A pair of friction clamping members 61 and 62 are disposed about a slide bar 63 carried by guide lugs 64 disposed in outstanding relation to a plate 65 secured to or integral with a bracket 66 of substantially L shape in transverse section. The slide bar 63 is connected as by a link 67 to the throttle pedal 49b, and a spring 68 is secured to one end of the bar 67 and constantly urges the bar 67 in one direction. The spring 68 is adapted to be connected to the desired part of the engine or vehicle body. Springs 69 engaging pins 70 carried by the clutch member 61 constantly urge the clutch member 62 and the clutch member 61 to frictionally resist movement of the bar 63. The clutch members 61 and 62 have limited movement between the lugs 64. A lug 71 is fixed to the inner clutch member 61 and slidably engages the bar 60. A spring 72 is diposed about the bar 60 and at one end engages against the lug 71, and at the other end engages against a washer 73 held against movement on the bar 60 by means of a pin 74.

A rock lever 75 is rockably carried by the lower or horizontal leg 76 of the bracket 66 and is connected as by a pivotal member 77 to the outer end of the slide bar 60. The gradual movement of the slide bar 60 so as to effect rocking of the blade 30b to engage the contact 28b is effected by means of a piston 78 which at one end engages the lever 75. A housing 79 is secured to the horizontal portion 76 of the bracket 66 and is provided with a liquid holding chamber 80 and a cylinder 81 in which the piston 78 is slidable. A spring 82 is disposed in the cylinder 81 and constantly urges the piston 78 upwardly. The housing 79 is provided with an intake passage 83 communicating at one end with the chamber 80 and at the other end with the cylinder 81. A check valve 84 is adapted to prevent return flow of the liquid to chamber 80 through the passage 83 and is held on its seat by a relatively weak spring 85 which is carried by a threaded member 86. The housing 79 is also provided with a second or return passage 87 which communicates at one end with the chamber or reservoir 80 and at the other end with the cylinder 81. The return of the liquid through the passage 87 to the chamber 80 is controlled or retarded by means of a needle valve member 88.

The construction illustrated in Figs. 5, 6, 7, 8, and 9 operates as follows: When the pedal 49b is depressed so as to speed up the engine the spring 68 will pull the slide bar 63 forwardly or towards the right against the friction of the clutch members 61 and 62. The tension of the spring 68 is less than the tension of the spring 89 which returns the pedal 49b so that when the pressure of the foot on the pedal 49b is released the spring 89 will be able to return the pedal 49b to its closed position. Return of the pedal 49b towards its closed position will move the clutching members 61 and 62 rearwardly or towards the left and thereby increase the tension of the spring 72 and cause rearward movement of the bar 60 which in turn will rock the barrel 36b downwardly so that the blade 30b will be disengaged from the contact 28b and will engage the terminal 29b. The rearward movement of the bar 60 will rock the lever 75 downwardly thereby moving the piston 78 downwardly against the tension of the spring 82. A fluid pressure will thereby be built up in the cylinder 81, as the needle valve 88 partly obstructs the passage 87 and the flow of the liquid towards the chamber 80 will be retarded and thereby gradually release the compression of the spring 72 to effect a retardation of the actuation of the blade 30b. When the pedal 49b is again being depressed to speed up the engine the spring 72 will lose contact with the arm 71 and the spring 82 will gradually force the piston 78 upwardly, since the obstruction caused by the needle valve 88 will cause a suction in the cylinder 81 to thereby effect a retarded actuation of the blade 30b engaging the contact 28b and relatively to the movement of the pedal 49b. Such retardation may be further adjusted by the threaded member 86, whereby the fluid flow through the passage 83 may be regulated by limiting the opening stroke of the check valve 84 against the influence of the vacuum in chamber 81.

In Figs. 11 and 12, there is disclosed a further form of this invention wherein the slide bar 63a engages a guide means 90 carried by a housing 91 which may be attached to either the switch housing 10 or the switch housing 10b. A friction member 92 is mounted in the housing 91 and slidably engages in a pivotable barrel or sleeve 93 having a trunnion 94 journaled in a bushing 95 carried by the housing 91. A friction element 96 is carried by the member 92 and contacts with the slide bar 63a so as to resist movement in both directions of this bar under the action of the spring 68a or the link 67a.

The housing 91 has a slide bar 60b disposed therein and the barrel 93 has a forked member 97 loosely engaging opposite sides of the rod 60b. Opposed springs 98 and 99 are mounted on the rod 96 and engage on opposite sides of the forked member 97. The bar 60b is retarded in its forward movement by means of a friction member 100 which is adjusted by a screw 101, and the rearward movement of the bar 60b is retarded by a similar friction member 102 which is adjusted by a screw 103. When the rod 63a is moved forwardly or to the right under the action of the spring 68a the barrel 93 is rocked rearwardly or to the left and the left spring 98 will be placed under tension. The increased tension of this spring 98 will effect a gradual movement of the rod 60b against the braking of the friction member 102.

When the rod 63a is moved rearwardly under the action of the throttle pedal spring the barrel 93 with its forked member 97 will be rocked forwardly to thereby increase the tension of the spring 99. When sufficient tension has been built up in this spring 99 the rod 60b will be moved forwardly against the friction of the spring-pressed friction member 100. In the forward movement of the rod 60b the friction member 102 will not retard the movement of the rod. The rod 60b is adapted to be connected to any desired switch operating member such as hereinbefore described. The effectiveness of the friction elements 100 and 102 may be adjusted by their respective adjusting screws 101 and 103 to thereby regulate the retardation of motion of the rod 60b to any desired extent.

In Fig. 13, there is disclosed a still further form of this invention wherein the housing 104 has a slide bar 105 slidable therethrough and one side of this bar 105 is provided with teeth 106. A rock lever 107 is mounted on a pivot 108 and one end of the lever 107 engages the teeth of the bar 105, while the other end is pivotally secured as at 109 to an insulated contact rod 110. A guide spring 111 engages a sliding contact 112 and wipes the contacts 12c and 14c. The spring 111 is connected to a terminal 13c which is adapted to be connected to a source of current supply.

The springs 98c and 99c acting oppositely upon the lever 107 insures engagement of the latter with the toothed portion 106 of the bar 105 at the reversal of the latter's movement. The operation of the lever 107 of the device shown in Fig. 13 is similar to the action of the member 93 of the device shown in Fig. 11, since they both act to transmit a limited amount of motion in both directions from the manually operated part to the switch operating part.

In Figure 4 there is shown a wiring diagram incorporating a double filament head-light bulb 20 and for use in connection with the device herein disclosed. A signal light 113 is connected by a conductor 114 to the terminal 14 to be lit concurrently with the dim beam projected from the upper filament 23 of the bulb 20. A switch 115 may be interposed so that the signal light may be cut out when desired.

When the contact arm 24 of the switch 15 is operated to close the circuit between the battery B and the contact 26 and 16, and the switch arm or blade 30, 30b, respectively, within the housing 10, 10b, respectively, is in a position, as shown in Figs. 1 and 5, the current will pass through both filaments 19 and 23. When by the automatic action of the device, contact is established between the switch blade 30, 30b, respectively, and the terminal 14, 14b, respectively, the current will then pass through the upper filament 23 only.

If the contact arm 24 is operated to connect the battery B with the contact 16 only, the current will then pass through either one of the filaments 19 or 23 according to the position of the automatically operated contact blade 30, 30b, respectively.

Should the automatic device, for any reason, become inoperative in any position, then manual control of the lights may be resorted to by appropriate manipulation of the switch 15 and the auxiliary switch 17b, which will be well understood by those skilled in the art.

Figure 10 shows another wiring diagram wherein a single filament bulb 20a is used. When the switch arm 24a of the manual switch 15a closes a circuit with the contact 16a and the auxiliary switch 27b closed the current passes from the terminals 13, 13b, respectively, to the terminals 12, 12b, respectively, as shown in Figs. 1 and 5 and therefrom through the bulb 20a to the ground.

When the switch blade 30, 30b, respectively, is operated in the opposite position by the automatic action of the device, the current will then pass from the terminals 14, 14b, respectively, to the signal light 113a, while another current passing through the conductor 27a and reduced in voltage by the resistance element 22b, will feed the light bulb 20a to thereby project a dim light beam.

For manually controlling the intensity of the head light beams, the switch arm 24a may be operated to selectively establish contact with the contact terminals 16a or 26b.

It will be apparent from the foregoing that a means has been provided which may be connected to an engine and interposed in the lighting system of the vehicle whereby the head lights of the vehicle may be dimmed or their bright beams deflected when the throttle pedal has been retarded from any position greater than the retarded or closed position, and the lights will remain dimmed or deflected until the pedal has been pressed forwardly to open position or a position forward of closed position whether it be completely open or only partially open.

It is of course understood that various changes and modifications may be made in the invention hereinbefore described, such changes and modifications being limited only by the scope of the following claims:—

I claim:—

1. In an automotive vehicle including a light projecting a light beam in one direction and means operable coactive with a predetermined minimum operation of the engine throttle at any and all positions between closed and open position whereby to change the density of the light beam from said light in said direction.

2. In an automotive vehicle including a light and control means for said light including actuating means responsive to a predetermined minimum operation of the engine throttle from any and all positions between open and closed position.

3. In an automotive vehicle comprising an internal combustion engine, a light, control means for said light and means subjective to the vacuum of the intake line of the engine whereby to operate said control means upon variations of the vacuum caused by the operation of a predetermined minimum engine throttle from any and all positions.

4. In an automotive vehicle comprising an internal combustion engine, a light, control means for the light, means subjected to the variations of the vacuum in the intake line of the engine caused by a predetermined minimum operation of the throttle from any and all positions between open and closed whereby to operate said control means, and means for automatically regulating the maximum vacuum influence upon said vacuum subjected means.

5. In an automotive vehicle comprising an internal combustion engine, a light, control means for the light, vacuum operated means responsive to variations of the vacuum in the intake line of the engine caused by a predetermined minimum operation of the engine throttle from any and all positions whereby to actuate the light control means, and means for retarding the actuation of said control means relatively to the operation of the throttle.

6. In an automotive vehicle, a light projecting a light beam in one direction, control means for said light and operating means active upon a predetermined minimum operation of the engine throttle towards the closed position from any and all positions between open and closed position whereby to operate said control means to thereby effect the elimination of the glare from said light beam in said direction.

7. A means for controlling the light beam projected from the light of an automotive vehicle, actuating means for said control means acting upon a predetermined minimum movement of the throttle control means from any and all positions between open and closed position, and means whereby to retard the actuation of said actuating means relative to the movement of the throttle control means.

8. In an automotive vehicle having a lighting circuit, a switch interposed in the circuit, control means for said switch comprising a driving element connected to move in unison with the manual engine speed control means, a driven element operatively connected to said switch, and operative connections between said driving element and said driven element for transmitting a limited amount of motion from the driving element and from any and all positions of its course of travel to said driven element to thereby actuate said switch for changing the light in said light circuit upon manual operation of said speed control means in either direction.

9. In an automotive vehicle including a light, an electric circuit, control means for said circuit and operable coactive with a predetermined minimum operation of the engine throttle controls from any and all positions between open and closed position whereby to effect changes of the light beam projected from said light.

10. In an automotive vehicle including lighting circuits, a multiple switch therefor and switch operating means active upon a predetermined minimum movement of the engine throttle controls in one direction and from any and all positions between open and closed whereby to operate said switch into one position to thereby control the lights in the circuits, said switch operating means operating said switch into a relatively opposite position upon a predetermined minimum movement of said throttle controls in a reversed direction and from any and all positions between open and closed.

11. In an automotive vehicle including lighting circuits, a light pointing in the forward direction and a light pointing in the rearward direction of the vehicle, a multiple switch in said circuits for normally affecting said forward light to project a bright light beam and to break the circuit of said rear light, and switch control means operable coactively with a predetermined minimum movement of the engine throttle controls from any and all positions between open and closed and towards the closed position, thereby affecting said forward light so as to project a dim light beam and to simultaneously light said rear light.

12. In an automotive vehicle having a lighting circuit, a switch in said circuit, control means for said switch comprising a driving element connected to move in unison with the manual engine speed control means, operating means for said switch, a driven element yieldingly connected to said switch operating means and a friction drive between said driving element and said driven element for transmitting motion from the driving element and from any and all positions of its course of travel to said driven element to thereby effect actuation of said switch for changing the light in said circuit upon operation of said speed control means in either direction, and adjustable brake means whereby to retard the operation of said switch relatively to the movement of said driving element in said direction.

13. In an automotive vehicle having a lighting circuit, a switch in said circuit, control means for said switch comprising a driving element operatively connected to move in unison with the manual engine speed control means, operating means for said switch, a driven element yieldingly connected to said switch operating means, a friction element for transmitting motion to said driven element from said driving element upon manual operation of said speed control means in one direction and from any and all positions of the latter's course of travel to operate said operating means in one direction, resilient means yieldingly resisting the movement of said switch operating means in said direction, said resilient means acting to operate said operating means in an opposite direction upon reversed manual operation of said speed control means, and adjustable brake means acting to retard the motion of said switch operating means in either direction and relatively to the motion of the manual operation of said speed control means.

14. In an automotive vehicle comprising an internal combustion engine, a light, control means for the light, resilient means for normally holding said control means in one position, vacuum operable means having a communication with the intake line of the engine and responsive to variations of the vacuum caused by a predetermined minimum operation of the engine throttle from any and all positions to thereby actuate the light control means in one direction, spring pressed movable valve means subjected to the differential of fluid pressures between the intake line and the atmosphere for regulating the effective passage area of said communication in direct proportion to the absolute pressure in the intake line whereby automatically regulating the maximum vacuum influence upon said vacuum operable means, and adjusting means for said valve means whereby to restrict said passage for retarding the operation of said vacuum operable means in said direction and relative to the manual operating speed of the throttle.

15. In an automotive vehicle comprising an internal combustion engine, a light, control means for the light, a vacuum actuator having communication with the suction line of the engine and connected to operate said control means, resilient means for counterbalancing a predetermined minimum vacuum effect upon the actuator whereby to maintain said control means normally in one position, a spring pressed valve subjected to the differential of fluid pressures between the suction line and the atmosphere for automatically regulating the effective passage area of said communication upon an increase of suction power resulting from an operation of the throttle from any and all positoons and towards the closed position to thereby control the actuator actuation of said control means in one direction, and an adjustable check valve in said communication for regulating the fluid flow therein to thereby retard the reverse actuation of said control means by said resilient means upon manual throttle operation from any and all positions towards the open position.

16. In an automotive vehicle having a signal light pointing in the rearward direction of the vehicle, control means for said light, operating means including a friction drive for said control means, and engine throttle controls, said operating means actuating said light control means upon pre-determined minimum manual operation of the engine throttle controls from any and all positions between open and closed positions, whereby to effect changes of said signal light upon the movements opposite to each other of said throttle controls.

JOHN J. KUNDIG.